(12) United States Patent
Kemmochi et al.

(10) Patent No.: US 7,924,117 B2
(45) Date of Patent: Apr. 12, 2011

(54) MULTI-BAND HIGH-FREQUENCY CIRCUIT, MULTI-BAND HIGH-FREQUENCY CIRCUIT COMPONENT AND MULTI-BAND COMMUNICATION APPARATUS USING SAME

(75) Inventors: Shigeru Kemmochi, Saitama-ken (JP); Keisuke Fukamachi, Saitama-ken (JP); Kazuhiro Hagiwara, Saitama-ken (JP); Masayuki Uchida, Tottori-ken (JP)

(73) Assignee: Hitachi Metals Ltd., Tokyo (JP)

( * ) Notice: Subject to any disclaimer, the term of this patent is extended or adjusted under 35 U.S.C. 154(b) by 0 days.

(21) Appl. No.: 12/393,615

(22) Filed: Feb. 26, 2009

(65) Prior Publication Data

US 2009/0201099 A1     Aug. 13, 2009

Related U.S. Application Data

(62) Division of application No. 10/596,372, filed on Jun. 9, 2006, now Pat. No. 7,518,469.

(30) Foreign Application Priority Data

Dec. 11, 2003   (JP) ................................. 2003-413623

(51) Int. Cl.
*H03H 7/46* (2006.01)
*H01P 5/12* (2006.01)

(52) U.S. Cl. ..................... 333/132; 333/126; 333/129

(58) Field of Classification Search .......... 333/126–129, 333/132, 134
See application file for complete search history.

(56) References Cited

U.S. PATENT DOCUMENTS 5,784,687 A    7/1998   Itoh et al.

(Continued)

FOREIGN PATENT DOCUMENTS

JP   2000-269831 A    9/2000

(Continued)

*Primary Examiner* — Robert Pascal
*Assistant Examiner* — Kimberly E Glenn
(74) *Attorney, Agent, or Firm* — Sughrue Mion, PLLC

(57) ABSTRACT

A multi-band high-frequency circuit for performing wireless communications among pluralities of communication systems having different communication frequencies, comprising a high-frequency switch circuit comprising switching elements for switching the connection of pluralities of multi-band antennas to transmitting circuits and receiving circuits; a first diplexer circuit disposed between the high-frequency switch circuit and transmitting circuits for branching a high-frequency signal into frequency bands of the communication systems; a second diplexer circuit disposed between the high-frequency switch circuit and receiving circuits for branching a high-frequency signal into frequency bands of the communication systems; the first and second diplexer circuits each comprising a lower-frequency filter circuit and a higher-frequency filter circuit, a bandpass filter circuit being used as the lower-frequency filter circuit in the second diplexer circuit, or disposed between the lower-frequency filter circuit in the second diplexer circuit and the receiving circuit, the high-frequency switch circuit comprising first to fourth ports, the first port being connected to a first multi-band antenna, the second port being connected to a second multi-band antenna, the third port being connected to the first diplexer circuit, and the fourth port being connected to the second diplexer circuit; and the switching elements being controlled in an ON or OFF state to select a multi-band antenna for performing wireless communications and to switch the connection of the selected multi-band antenna to the transmitting circuit or the receiving circuit.

5 Claims, 19 Drawing Sheets

U.S. PATENT DOCUMENTS

| | | |
|---|---|---|
| 6,876,273 B2 * | 4/2005 | Harada et al. ............. 333/133 |
| 7,057,472 B2 | 6/2006 | Fukamachi et al. |
| 7,127,269 B2 | 10/2006 | Shih |
| 7,206,551 B2 | 4/2007 | Itakura et al. |
| 7,388,453 B2 * | 6/2008 | Okuyama et al. ............. 333/132 |
| 2001/0027119 A1 | 10/2001 | Furutani et al. |
| 2002/0183016 A1 | 12/2002 | Kemmochi et al. |
| 2003/0048154 A1 | 3/2003 | Satoh et al. |
| 2003/0207668 A1 | 11/2003 | McFarland et al. |
| 2006/0044080 A1 | 3/2006 | Hagiwara et al. |
| 2006/0286942 A1 | 12/2006 | Okuyama |

FOREIGN PATENT DOCUMENTS

| | | |
|---|---|---|
| JP | 2001-274723 | 10/2001 |
| JP | 2001-285114 A | 10/2001 |
| JP | 2002-026624 A | 1/2002 |
| JP | 2002-118487 A | 4/2002 |
| JP | 2002-208873 A | 7/2002 |
| JP | 2003-046408 A | 2/2003 |
| JP | 2003-152590 A | 5/2003 |
| JP | 2003-169008 A | 6/2003 |
| WO | 01/48935 A1 | 7/2001 |

* cited by examiner

MULTI-BAND HIGH-FREQUENCY CIRCUIT, MULTI-BAND HIGH-FREQUENCY CIRCUIT COMPONENT AND MULTI-BAND COMMUNICATION APPARATUS USING SAME

This is a divisional of application Ser. No. 10/596,372 filed Jun. 9, 2006. The entire disclosure(s) of the prior application (s), application Ser. No.(s) 10/596,372 is considered part of the disclosure of the accompanying divisional application and is hereby incorporated by reference.

FIELD OF THE INVENTION

The present invention relates to a wireless communication apparatus for performing wireless transmission between electronic or electric equipments, particularly to a multi-band high-frequency circuit and a multi-band high-frequency circuit component commonly usable for at least two communication systems and capable of conducting diversity receiving, and a multi-band communication apparatus comprising such a multi-band high-frequency circuit component.

BACKGROUND OF THE INVENTION

Data communications by wireless LAN (WLAN) typically according to the IEEE802.11 standards are now widely used. They are used in personal computers (PCs); peripherals such as printers, hard disk drives, broadband rooters, etc.; electronic appliances such as facsimiles, refrigerators, standard-definition televisions (SDTVs), high-definition televisions (HDTVs), digital cameras, digital video recorders, cell phones, etc.; and as signal-transmitting means in place of wires in automobiles and aircrafts, and wireless data transmission is conducted among these electronic or electric appliances.

There are now pluralities of standards of wireless LAN. For instance, IEEE802.11a is adapted to high-speed data communications of 54 Mbps at maximum in a frequency band of 5 GHz, using an OFDM (orthogonal frequency division multiples) modulation system. Incidentally, there is IEEE802.11h as the standard for making IEEE802.11a usable in Europe.

IEEE802.11b is adapted to high-speed communications of 5.5 Mbps and 11 Mbps in an industrial, scientific and medical (ISM) band of 2.4 GHz that can be freely used without wireless license, using a direct sequence spread spectrum (DSSS) system.

IEEE802.11g is adapted to high-speed data communications of 54 Mbps at maximum in a 2.4-GHz band like IEEE802.11b, using the OFDM (orthogonal frequency division multiples) modulation system.

Explanation will be made below using IEEE802.11a and IEEE802.11h as a first communication system, and IEEE802.11b and IEEE802.11g as a second communication system, if necessary.

A multi-band communication apparatus using such WLAN is described in JP2003-169008A. This multi-band communication apparatus comprises two dual-band antennas capable of transmitting and receiving in two communication systems having different communication frequency bands (IEEE802.11a, IEEE802.11b), two transmitting/receiving means for modulating transmission data and demodulating receiving data in each communication system, pluralities of switch means for connecting the antennas to the transmitting/receiving means, and switch control means for controlling the switch means, so that it can perform diversity receiving (see FIG. 33).

As another example, JP2002-033714A describes a multi-band communication apparatus using one multi-band antenna. This multi-band communication apparatus comprises a 2.4-GHz-band, front-end circuit and a 5-GHz-band, front-end circuit each comprising a switch circuit, amplifiers, a mixer, etc., a switch circuit SW1 for selectively connecting one of them to a common multi-band antenna, switch circuits SW2, SW3 for switching transmitting/receiving circuits, and a switch circuit SW4 connected to an intermediate-frequency filter BPF (see FIG. 34).

In multi-band communication apparatuses for WLAN, a carrier sense multiple access (CSMA:) system is adopted to scan the frequency to sense the receivable frequency channel (carrier) before starting communications.

In the multi-band communication apparatus of JP2003-169008A, to conduct this scanning operation, the antenna ANT1 is connected to a receiving terminal Rx of the transmitting/receiving means of 802.11a, and the antenna ANT2 is connected to a receiving terminal Rx of the transmitting/receiving means of 802.11b, by six single-pole, double-throw (SPDT) switch means (SW1-SW6). The transmitting/receiving means of 802.11a is scanned in a 5-GHz band, and the transmitting/receiving means of 802.11b is scanned in a 2.4-GHz band, to sense all receivable vacant channels.

The next step is to compare a receiving signal in a 5-GHz band received by the dual-band antenna ANT1 with a receiving signal in a 2.4-GHz band received by the dual-band antenna ANT2, and select one of the two communication systems by which a more desired signal is received, as an active communication system.

After this scanning operation, the other antenna is connected to the transmitting/receiving means of the selected communication system to perform receiving without changing the receiving channel. The receiving signals from two antennas are compared, and an antenna capable of performing better receiving is selected as an active antenna to conduct diversity receiving.

Also, in the multi-band communication apparatus of JP2002-033714A, receiving signals in 2.4-GHz and 5-GHz bands are scanned by one dual-band antenna ANT1 to sense all receivable vacant channels, and a channel of a desired communication system is selected.

As in the conventional multi-band communication apparatuses, the selection of communication system channels based on the comparison results of receiving signals obtained from different antennas or one antenna connected to each communication system is under unneglible influence by disturbances such as noises from other communication systems and electronic equipments, phasing, etc., resulting in the likelihood that a communication system channel to be selected is erroneously sensed as busy, and that a communication system in which a receiving signal has the largest amplitude is not selected.

There are electromagnetic waves leaking from electronic ovens, noises from communication systems such as Bluetooth®, radio frequency identification (RFID), etc. particularly in a frequency band of 2.4 GHz, and there are communication systems of cell phones having relatively large transmission power, such as WCDMA (wide band code division multiple access), etc., in nearby frequency bands. These high-frequency signals interfere communications in the WLAN systems. However, the conventional multi-band communication apparatuses do not have any measure to cope with such noises, etc.

Also, because high-frequency signal paths should be switched by many switch means in the conventional multi-band communication apparatus, control becomes complicated depending on the number of switch means. Because the switch means have transmission loss to some extent, many switch means disposed in paths from antennas to transmitting/receiving means increase transmission loss according to their number. Particularly at the time of receiving, the quality of a high-frequency signal input through an antenna is disadvantageously deteriorated. In addition, because power consumed by switching means is not negligible in battery-driven equipments such as note PCs, cell phones, etc., it has been requested to constitute a multi-band high-frequency circuit with few numbers of switch means.

In IEEE802.11h, the function of dynamic frequency selection (DFS) or transmission power control (TPC) is newly required. The TPC function is to reduce power consumed for transmission to a minimum level when good communications can be made even at a suppressed transmission power, for instance, in a case where mobile terminals are close to a base.

Various circuit elements such as switch circuits, etc. disposed between the output port of a power amplifier and a multi-band antenna generate insertion loss. Because this insertion loss has frequency characteristics, output power from a multi-band antenna is not constant depending on frequency channels used by the multi-band high-frequency circuit, but variable depending on the channels used. Accordingly, it is necessary to precisely control output power from the amplifier.

For instance, to perform a TPC function in the multi-band communication apparatus of JP2003-169008A, a coupling circuit (for instance, a directional coupler) should be connected between the transmitting/receiving means of IEEE802.11a and the switch circuit SW3, and between the transmitting/receiving means of IEEE802.11b and the switch circuit SW4, to input a detection signal from the directional coupler to a detection circuit, thereby controlling an output signal based on the resultant detection voltage. However, this method needs directional couplers, detection diodes and smoothing circuits in both 2.4-GHz band and 5-GHz band. Further, when a common control circuit is used, an analog switch for selecting detection voltage terminals in a 2.4-GHz band and a 5-GHz band is also needed. This increases the number of parts, resulting in difficulty in the miniaturization of communication apparatuses.

High-frequency circuits for WLAN also need filter circuits for removing unnecessary frequency components contained in transmission signals and receiving signals, in addition to switch circuits for switching diversity switches, transmitting circuits and receiving circuits. Further, balanced-to-unbalanced converters for converting balanced signals to unbalanced signals, and impedance-converting circuits are needed.

When contained in cell phones or note PCs, or used as network cards of PCMCIA (personal computer memory card international association), it is strongly desired to miniaturize multi-band communication apparatuses.

OBJECTS OF THE INVENTION

Accordingly, the first object of the present invention is to provide a multi-band high-frequency circuit commonly usable in at least two communication systems, and capable of selecting the most desirable wireless communication channel substantially without influence by noises, phasing, etc., and further capable of performing diversity receiving.

The second object of the present invention is to provide a multi-band high-frequency circuit capable of switching the connection of multi-band antennas to transmitting circuits and receiving circuits with a few switch means, which comprises a coupling circuit, a filter circuit, a balanced-to-unbalanced converter and an impedance-converting circuit with small numbers of parts.

The third object of the present invention is to provide a multi-band high-frequency circuit component comprising the above multi-band high-frequency circuit in a small three-dimensional laminate structure.

The fourth object of the present invention is to provide a multi-band communication apparatus comprising a transmitting/receiving means for modulating transmission data and demodulating receiving data in each communication system, and a switch circuit controller for controlling the switching of the high-frequency switches.

DISCLOSURE OF THE INVENTION

The multi-band high-frequency circuit for performing wireless communications among pluralities of communication systems having different communication frequencies according to one embodiment of the present invention comprises a high-frequency switch circuit comprising switching elements for switching the connection of pluralities of multi-band antennas to transmitting circuits and receiving circuits; a first diplexer circuit disposed between the high-frequency switch circuit and transmitting circuits for branching a high-frequency signal into frequency bands of the communication systems; a second diplexer circuit disposed between the high-frequency switch circuit and receiving circuits for branching a high-frequency signal into frequency bands of the communication systems; the first and second diplexer circuits each comprising a lower-frequency filler circuit and a higher-frequency filter circuit, a bandpass filter circuit being used as the lower-frequency filter circuit in the second diplexer circuit, or disposed between the lower-frequency filter circuit in the second diplexer circuit and the receiving circuit; the high-frequency switch circuit comprising first to fourth ports, the first port being connected to a first multi-band antenna, the second port being connected to a second multi-band antenna, the third port being connected to the first diplexer circuit, and the fourth port being connected to the second diplexer circuit; and the switching elements being controlled in an ON or OFF state to select a multi-band antenna for performing wireless communications and to switch the connection of the selected multi-band antenna to the transmitting circuit or the receiving circuit.

The multi-band high-frequency circuit for performing wireless communications among pluralities of communication systems having different communication frequencies according to another embodiment of the present invention comprises a high-frequency switch circuit comprising switching elements for switching the connection of one multi-band antenna to transmitting circuits and receiving circuits; a first diplexer circuit disposed between the high-frequency switch circuit and the transmitting circuits for branching a high-frequency signal into frequency bands of the communication systems; a second diplexer circuit disposed between the high-frequency switch circuit and the receiving circuits for branching a high-frequency signal into frequency bands of the communication systems; the first and second diplexer circuits each comprising a lower-frequency filter circuit and a higher-frequency filter circuit, a bandpass filter circuit being used as the lower-frequency filter circuit in the second diplexer circuit, or disposed between the lower-frequency (liter circuit in the second diplexer circuit and the receiving circuit, the high-frequency switch circuit comprising first to third ports, the first port being connected to a first multi-band antenna via a matching circuit, the second port being connected to the first diplexer circuit, and the third port being connected to the second diplexer circuit; and the switching elements being controlled in an ON or OFF state to switch the connection of the multi-band antenna to the transmitting circuit or the receiving circuit.

The bandpass filler circuit has, for instance, a passband of 2.4 GHz to 2.5 GHz, off-band high-frequency signals being attenuated to remove noises, so that the high-frequency circuit is resistant to their influence.

A coupling circuit for taking part of a transmission power in pluralities of communication systems may be disposed between the high-frequency switch circuit and the first diplexer circuit. The coupling circuit is preferably constituted by a coupling capacitor, comprising a matching circuit disposed between the coupling circuit and a detection circuit. Alternatively, the coupling circuit is preferably constituted by a directional coupler comprising a main line and a sub-line, comprising a matching circuit between one end of the sub-line and a detection circuit.

Each of the first and second diplexer circuits is constituted by parallel-connected lower-frequency filter circuit and higher-frequency filter circuit with one end as a common port, the lower-frequency filter circuit being a filter circuit permitting a 2.4-GHz-band, high-frequency signal to pass but attenuating a 5-GHz-band, high-frequency signal, and the higher-frequency filter being a filter circuit permitting a 5-GHz-band, high-frequency signal to pass but attenuating a 2.4-GHz-band transmission signal.

The lower-frequency filter circuit in the second diplexer circuit is preferably constituted by a phase circuit and a bandpass filter circuit having a 2.4-GHz passband, the phase circuit controlling the impedance of the bandpass filter circuit in a band of 5 GHz to high impedance when viewed from the high-frequency switch circuit. With this structure, the number of circuit elements in the lower-frequency filter circuit can be reduced, resulting in excellent passband characteristics and off-band attenuation.

The lower-frequency filter circuit is a lowpass filter circuit, a combination of a highpass filler circuit and a lowpass filter circuit, or a bandpass filter circuit, and the higher-frequency filter circuit is preferably a highpass filter circuit or a bandpass filter circuit.

In a preferred embodiment, the multi-band high-frequency circuit comprises a first balanced-to-unbalanced convener disposed between the lower-frequency filter circuit in the second diplexer circuit and the receiving circuit, and a second balanced-to-unbalanced converter disposed between the higher-frequency filter circuit in the second diplexer circuit and the receiving circuit.

In another preferred embodiment, the multi-band high-frequency circuit comprises a transmitting/receiving means for modulating transmission data and demodulating receiving data in each communication system, and a switch circuit controller for controlling the switching of the high-frequency switch.

The multi-band high-frequency circuit component of the present invention comprises the above multi-band high-frequency circuit, a laminate of substrates having electrode patterns and elements mounted onto the laminate, at least part of inductance elements and capacitance elements being constituted by the electrode patterns, and at least the switching elements being mounted onto the laminate, among circuit elements constituting the high-frequency circuit.

The multi-band communication apparatus of the present invention comprises the multi-band high-frequency circuit or the multi-band high-frequency circuit component.

The multi-band high-frequency circuit of the present invention can select the most suitable channels substantially without influence by noises, phasing, etc. in data communications by WLAN, and perform diversity receiving. It can also switch the connection of multi-band antennas and transmitting/receiving circuits while suppressing power consumption with few numbers of switch means.

The high-frequency circuit of the present invention can be constructed in the form of a high-frequency circuit component having a small three-dimensional laminate structure. Further, it is possible to provide a multi-band communication apparatus with a transmitting/receiving means for modulating transmission data and demodulating receiving data in each communication system, and a switch circuit controller for controlling the switching of the high-frequency switch.

DESCRIPTION OF THE PREFERRED EMBODIMENTS

The present invention will be explained in detail below referring to the attached drawings.

Embodiment 1

Figure 1:
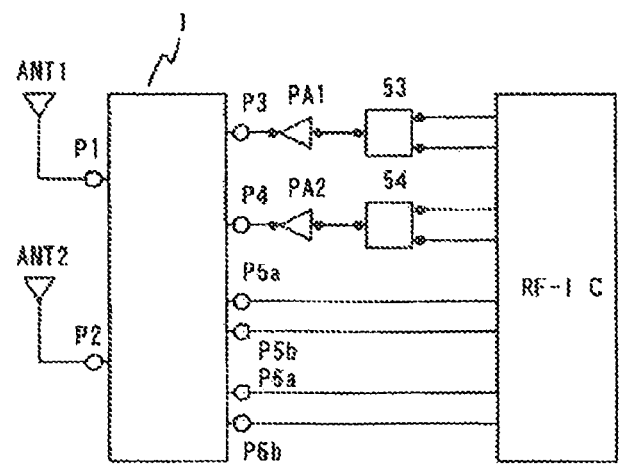
FIG. 1 is a block diagram showing the circuit of the multi-band communication apparatus according to one embodiment of the present invention.

FIG. 1 shows the circuit of the multi-band communication apparatus according to a preferred embodiment of the present invention. This multi-band communication apparatus comprises two multi-band antennas ANT1, ANT2 transmittable and receivable in a 2.4-GHz band and a 5-GHz-band; a high-frequency switch 1 or a high-frequency circuit 1 comprising pluralities of diplexer circuits for switching the connection of the multi-band antennas and the transmitting circuits and receiving circuits; a transmitting/receiving circuit RF-IC comprising a transmitting/receiving means of IEEE802.11a and a transmitting/receiving means of IEEE802.11b for modulating transmission data and demodulating receiving data in each communication system, a switch circuit controller for controlling the switching of the high-frequency switch, and amplifiers for receiving signals; balanced-to-unbalanced converters 53, 54 for converting balanced signals to unbalanced signals; and amplifiers PA1, PA2 for transmission signals connected to the balanced-to-unbalanced converters. In another embodiment, the transmitting/receiving circuit RF-IC may comprise the balanced-to-unbalanced converters 53, 54, the amplifiers PA1, PA2 for transmission signals, and coupling circuits.

In this embodiment, the first communication system is IEEE802.11a, and the second communication system is IEEE802.11b, though the present invention is not particularly restricted thereto. For instance, because IEEE802.11h uses the same frequency band as IEEE802.11a, and IEEE802.11g uses the same frequency band as IEEE802.11b as described above, each circuit may be used in each communication system. When both IEEE802.11b and IEEE802.11g are used, a transmitting/receiving means capable of handling each of them is necessary, because they need different modulation systems.

Figure 2:
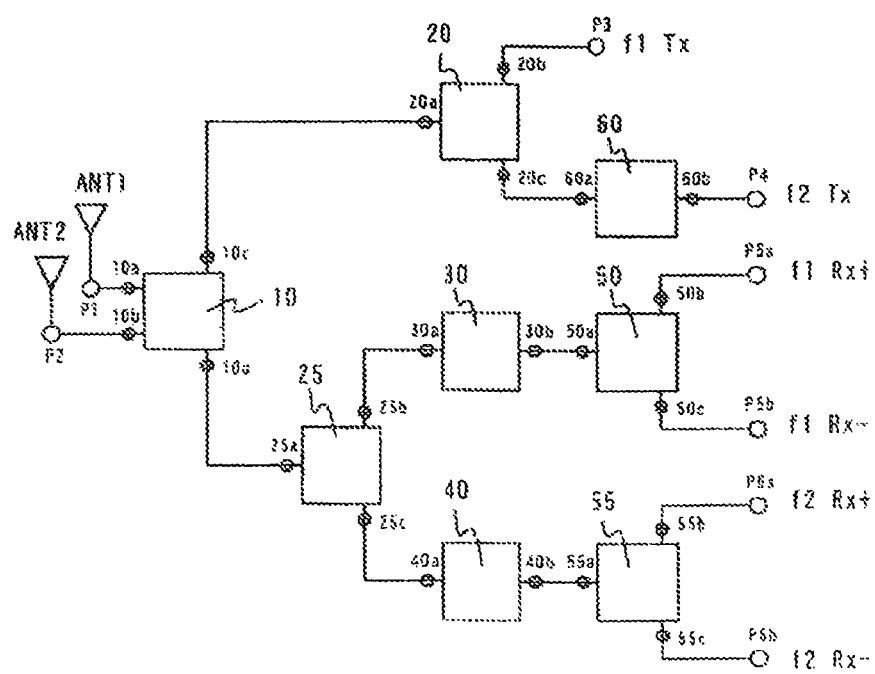
FIG. 2 is a block diagram showing the multi-band high-frequency circuit according to one embodiment of the present invention.
Figure 3:
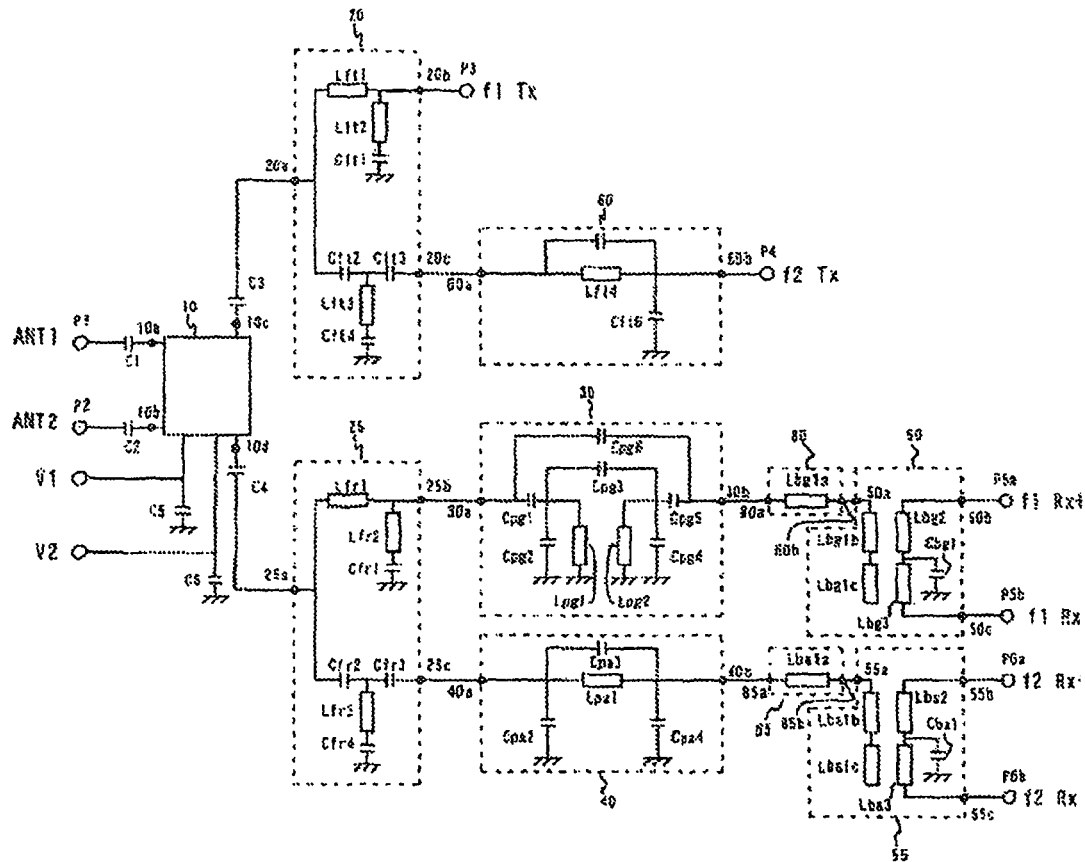
FIG. 3 is a view showing the equivalent circuit of the multi-band high-frequency circuit according to one embodiment of the present invention.

FIG. 2 shows one example of the high-frequency circuit 1, and FIG. 3 shows the equivalent circuit of the high-frequency circuit 1. The multi-band high-frequency circuit of the present invention (high-frequency circuit 1) comprises a high-frequency switch circuit 10, and first and second diplexer circuits 20, 25 connected thereto as basic components. The multi-band high-frequency circuit in this embodiment comprises a double-pole, double-throw (DPDT) high-frequency switch circuit 10 having four ports, which is connected to pluralities of multi-band antennas and pluralities of diplexer circuits. The high-frequency switch circuit 10 has a first port 10a connected to a first multi-band antenna ANT1 via a matching circuit constituted by a coupling capacitor C1 capable of functioning as a DC-cutting capacitor, a second port 10b connected to a second multi-band antenna ANT2 via a matching circuit constituted by a coupling capacitor C2, a third port 10c connected to a first diplexer circuit 20 for branching transmission signals, and a fourth port 10d connected to a second diplexer circuit 25 for branching receiving signals. The first diplexer circuit 20 has a third port 20c connected to a filter circuit 60, and the second diplexer circuit 25 has a second port 25b connected to a filter circuit 30 and a balanced-to-unbalanced converter 50, and a third port 25c connected to a filter circuit 40 and a balanced-to-unbalanced converter 55.

Figure 4:
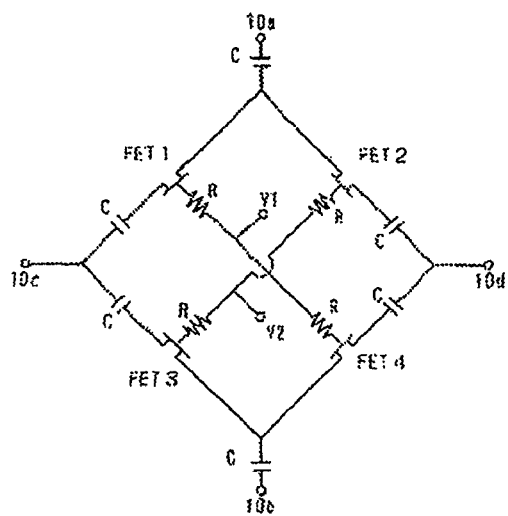
FIG. 4 is a view showing the equivalent circuit of one example of DPDT switches used in the present invention.

The high-frequency switch circuit 10 is mainly constituted by switching elements such as field-effect transistors (FETs), diodes, etc., and may comprise inductance elements and capacitance elements, if necessary. One structural example of the high-frequency switch circuit 10 is shown in FIG. 4. This high-frequency switch circuit 10 comprises four field-effect transistors series-connected to four annually disposed signal paths, and DC-cutting capacitors C series-connected to a third port 10c and a fourth port 10d among four signal paths. Because of small numbers of switching elements disposed in the high-frequency signal paths, little loss is generated by the switching elements.

When voltage controlled by the switch circuit controller is applied to the control terminals V1, V2, the ports of the high-frequency switch circuit 10 are connected as shown in Table 1.

TABLE I

| Connection Mode | V1 | V2 | Between Ports 10a and 10c | Between Ports 10a and 10d | Between Ports 10b and 10c | Between Ports 10b and 10d |
|---|---|---|---|---|---|---|
| 1 | High | Low | Connected | Disconnected | Disconnected | Connected |
| 2 | Low | High | Disconnected | Connected | Connected | Disconnected |

Detailed explanation will be made below on a case where voltage (High, for instance, +1 V to +5 V) equal to or higher than a threshold value permitting the operation of a field-effect transistor is applied to a control terminal V1 of the high-frequency switch circuit 10, while voltage (Low, for instance, 0 V) equal to or lower than the threshold value is applied to a control terminal V2.

In this case, the field-effect transistors FET1 and FET4 are in an ON state, while the field-effect transistors FET2 and FET3 are in an OFF state. Accordingly, a high-frequency signal input through the port 10c (on the side of the first diplexer circuit) of the high-frequency switch circuit 10 passes through the field-effect transistor FET1 in an ON stale, and transmitted to the port 10a (on the side of the first multi-band antenna). Because the field-effect transistor FET3 is in an OFF state at this time, its isolation characteristics substantially prevent the high-frequency signal from leaking to the port 10b (on the side of the second multi-band antenna). Also, because the field-effect transistor FET2 is in an OFF state, substantially no high-frequency signal leaks to the port 10d (on the side of the second diplexer circuit).

On the other hand, a high-frequency signal input through the port 10b (on the side of the second multi-band antenna) of the high-frequency switch circuit 10 passes through the field-effect transistor FET4 in an ON state, and transmitted to the port 10d (on the side of the second diplexer circuit). At this time, because the field-effect transistor FET2 is in an OFF state, the high-frequency signal does not substantially leak to the port 10a (on the side of the first multi-band antenna). Because the field-effect transistor FET3 is also in an OFF state, substantially no high-frequency signal leaks to the port 10c (on the side of the first diplexer circuit).

Next, explanation will be made on a case where voltage (for instance, +1 V to +5 V) equal to or higher than a threshold value permitting the operation of a field-effect transistor is applied to the control terminal V2, while voltage (0 V) equal to or less than the threshold value is applied to the control terminal V1. In this case, the field-effect transistors FET2 and FET3 are in an ON state, while the field-effect transistors FET1 and FET4 are in an OFF state. Accordingly, a high-frequency signal input through the port 10a (on the side of the first multi-band antenna) of the high-frequency switch circuit 10 passes through the field-effect transistor FET2 in an ON state, and transmitted to the port 10d (on the side of the second diplexer circuit). On the other hand, a high-frequency signal input through the port 10c (on the side of the first diplexer circuit) of the high-frequency switch circuit 10 passes through the field-effect transistor FET3 in an ON state, and transmitted to the port 10b (on the side of the second multi-band antenna).

When the transmitting and receiving of signals are conducted in the multi-band high-frequency circuit of the present invention, frequency scanning is first conducted before starting communications to sense a receivable frequency channel (carrier scanning). In the scanning operation, the high-frequency switch circuit 10 is controlled, for instance, to the connection mode 1 shown in Table 1 by the switch circuit controller. In this case, the second multi-band antenna ANT2 is connected to the second diplexer circuit 25, resulting in the connection of one multi-band antenna to the receiving circuits of two communication systems.

The second diplexer circuit 25 connected to the fourth port 10d of the high-frequency switch circuit 10 is constituted by a combination of a lower-frequency filter circuit permitting a high-frequency signal in a 2.4-GHz band (IEEE802.11b) to pass but attenuating a high-frequency signal in a 5-GHz band (802.11a), and a higher-frequency filter circuit permitting a high-frequency signal in a 5-GHz band (IEEE802.11a) to pass but attenuating a transmission signal in a 2.4-GHz band (IEEE802.11b). In this embodiment, the lower-frequency filter circuit is constituted by a lowpass (liter circuit comprising inductance elements and capacitance elements, while the higher-frequency filter circuit is constituted by a highpass filter circuit.

With such structure, among high-frequency signals input into the multi-band antennas and appearing at the fourth port 10d of the high-frequency switch circuit 10, a 2.4-GHz-band, high-frequency signal appears at the second port 25b of the second diplexer circuit 25, but not at the third port 25c, and a 5-GHz-band, high-frequency signal appears at the third port 25c of the second diplexer circuit 2, but not at the second port 25b. Thus, the 2.4-GHz-band, high-frequency signal is separated from the 5-GHz-band, high-frequency signal.

In the second diplexer circuit 25, the high-frequency signal appearing at its second port 25b with noise components removed by the bandpass filter circuit 30 is converted from an unbalanced signal to a balanced signal by the balanced-to-unbalanced converter 50 and input to the receiving circuit of IEEE802.11b. Also, the high-frequency signal appearing at the third port 25c is input to the receiving circuit of 55 IEEE802.11a via a filter circuit 40 and a balanced-to-unbalanced converter.

Based on the resultant high-frequency signal, scanning is performed in a 5-GHz band in the receiving circuit of IEEE802.11a, and in a 2.4-GHz band in the transmitting/receiving means of 802.11b, to sense all receivable channels.

Next, the switch circuit 10 is controlled to a connection mode 2 by the switch circuit controller. At this time, the first multi-band antenna ANT1 is connected to the second diplexer circuit 25 on the receiving circuit side. Based on the resultant high-frequency signal, scanning is performed in a 5-GHz band in the receiving circuit of IEEE802.11a, and in a 2.4-GHz band in the transmitting/receiving means of IEEE802.11b, to sense all receivable channels.

Based on the results of frequency scanning, the channel of a communication system to be activated is selected, and receiving signals received by the first and second dual-band antennas ANT1, ANT2 are compared in amplitude to select a multi-band antenna to be connected to the transmitting/receiving circuit of the communication system.

Accordingly, the most suited communication system can be selected even with disturbance such as phasing, etc. to conduct diversity receiving. Also, by performing carrier sense by a receiving signal made free from noises by a filter circuit, the most suitable channel in the wireless communications can be selected. When it is detected in the carrier sense that all channels are being used (busy), the carrier sense is performed again after the lapse of a certain period of time.

Next, transmitting is conducted in the selected channel. The selected multi-band antenna is connected to the first diplexer circuit 20 via the third port 10c of the high-frequency switch circuit 10. The first diplexer circuit 20 is constituted by a combination of a lower-frequency filter circuit permitting a high-frequency signal in a 2.4-GHz band (IEEE802.11b) to pass but attenuating a high-frequency signal in a 5-GHz band (IEEE802.11a), and a higher-frequency filter circuit permitting a high-frequency signal in a 5-GHz band (IEEE802.11a) to pass but attenuating a transmission signal in a 2.4-GHz band (IEEE802.11b). In this embodiment, the lower-frequency filter circuit is constituted by a lowpass filter circuit, and the higher-frequency filter circuit is constituted by a highpass filter circuit.

Accordingly, a 2.4-GHz-band, high-frequency signal input from the transmitting circuit of IEEE802.11b to the second port 20b of the first diplexer circuit 20 appears at the first port 20a via the lower-frequency filter circuit, but not at the third port 20c. On the other hand, a 5-GHz-band, high-frequency signal input from the transmitting circuit of IEEE802.11a to the third port 20c of the first diplexer circuit appears at the first port 20a via the higher-frequency filter circuit, but not at the second port 20b. Thus, the 2.4-GHz-band, high-frequency signal and the 5-GHz-band, high-frequency signal can be branched. Incidentally, because high-frequency signals in a 2.4-GHz band and a 5-GHz band are taken from the same port, it may be called "synthesized."

The high-frequency signal appearing at the first port 20a is input to the third port 10c of the switch circuit and radiated from the multi-band antenna.

Figure 5:
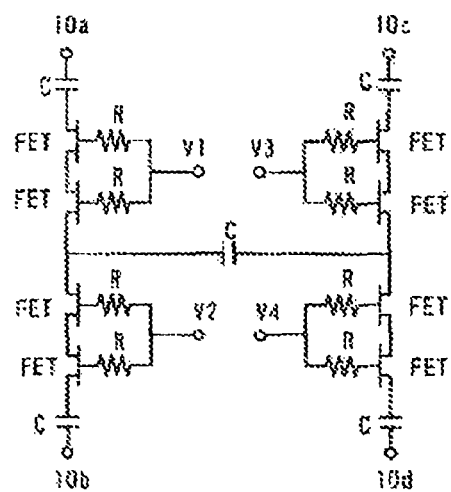
FIG. 5 is a view showing the equivalent circuit of another example of DPDT switches used in the present invention.
Figure 6:
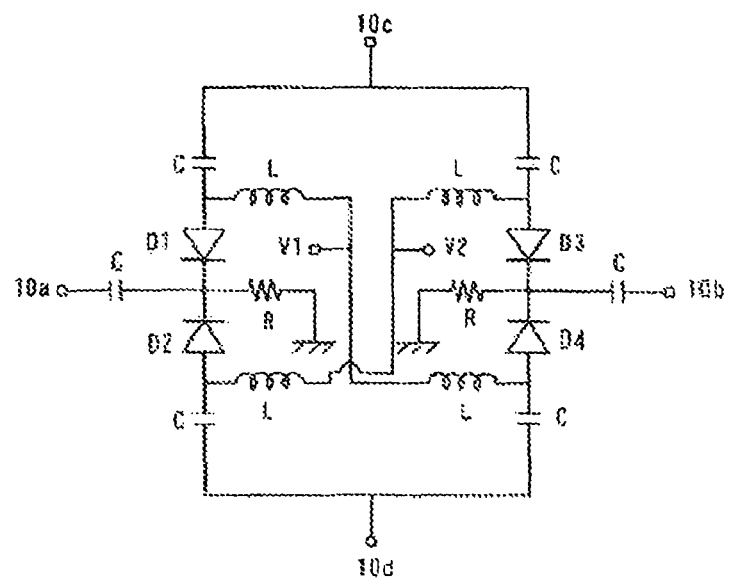
FIG. 6 is a view showing the equivalent circuit of a further example of DPDT switches used in the present invention.
Figure 7:
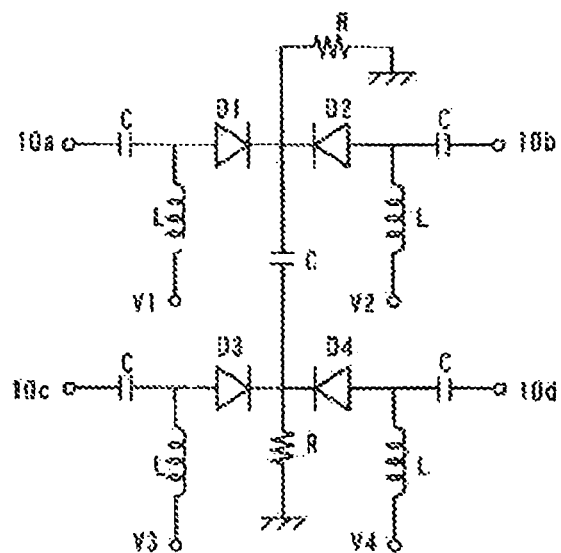
FIG. 7 is a view showing the equivalent circuit of a still further example of DPDT switches used in the present invention.

The equivalent circuits of other switch circuits 10 are shown in FIGS. 5-7. These equivalent circuits comprise as main elements switching elements such as field-effect transistors FET, diodes D1-D4, etc., as well as proper inductance elements and capacitance elements. For instance, they may be constituted using two single-pole, double-throw (SPDT) switches.

Figure 8:
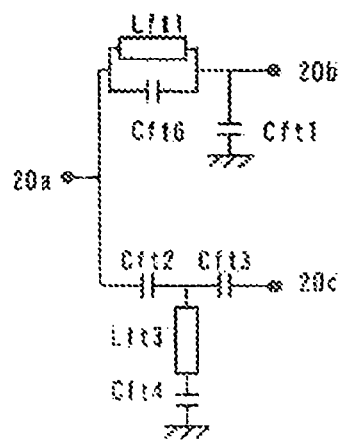
FIG. 8 is a view showing the equivalent circuit of one example of diplexer circuits used in the present invention.
Figure 9:
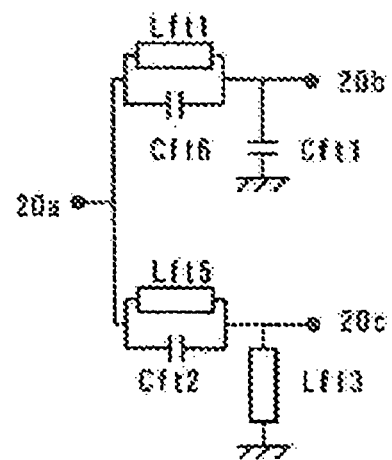
FIG. 9 is a view showing the equivalent circuit of another example of diplexer circuits used in the present invention.
Figure 10:
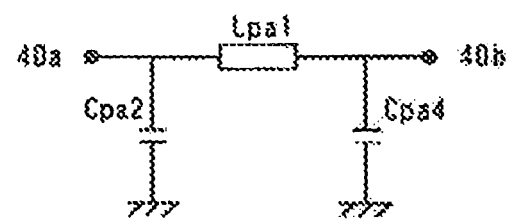
FIG. 10 is a view showing the equivalent circuit of one example of filter circuits used in the present invention.
Figure 11:
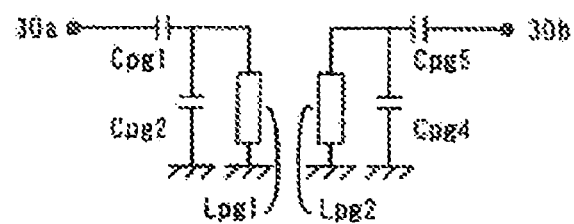
FIG. 11 is a view showing the equivalent circuit of another example of filter circuits used in the present invention.
Figure 12:
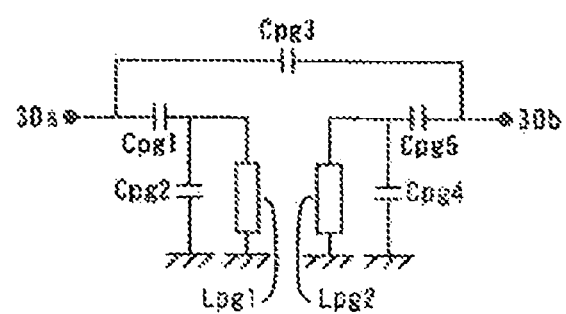
FIG. 12 is a view showing the equivalent of a further example of filter circuits used in the present invention.
Figure 13:
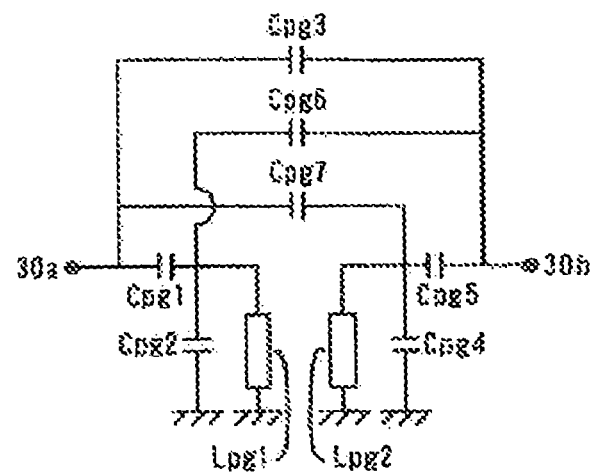
FIG. 13 is a view showing the equivalent circuit of a still further example of filter circuits used in the present invention.

The first and second diplexer circuits 20, 25 are constituted by proper combinations of lowpass filter circuits, highpass filter circuits and bandpass filter circuits comprising inductance elements and capacitance elements. The equivalent circuits of the diplexer circuits 20, 25 are exemplified in FIGS. 8 and 9.

Filter circuits 30, 40, 60 are also constituted by lowpass filler circuits, highpass filter circuits and/or bandpass filter circuits. These filler circuits are properly selected by the off-band attenuation of the diplexer circuits 20, 25. Other equivalent circuits of the filter circuit 30, 40, 60 are exemplified in FIGS. 10-13.

Figure 14:
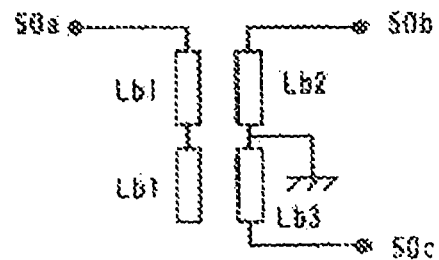
FIG. 14 is a view showing the equivalent circuit of one example of balanced-to-unbalanced circuits used in the present invention.
Figure 15:
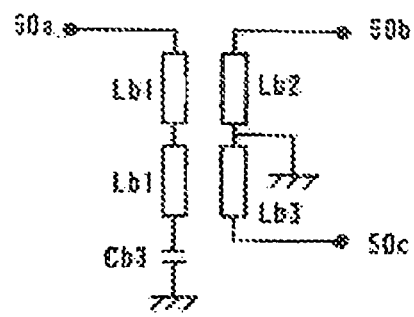
FIG. 15 is a view showing the equivalent circuit of another example of balanced-to-unbalanced circuits used in the present invention.
Figure 16:
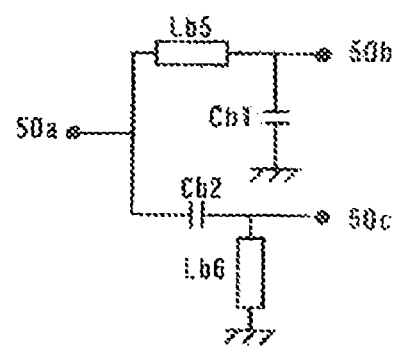
FIG. 16 is a view showing the equivalent circuit of a further example of balanced-to-unbalanced circuits used in the present invention.

The balanced-to-unbalanced converters 50, 55 are constituted by inductance elements and capacitance elements, and may have an impedance-converting function. Their equivalent circuits are exemplified in FIGS. 14-16. Because the use of an unbalanced input-balanced output SAW filter can integrate filter circuits and balanced-to-unbalanced converters into one circuit element, the number of elements can be reduced, resulting in the cost reduction and miniaturization of the high-frequency circuit. A SAW filter with different input impedance and output impedance may be used. In this case, it may have an impedance-converting function. Alternatively to the SAW filter, an FBAR filter may be used.

The multi-band high-frequency circuits comprising various diplexer circuits, filter circuits, balanced-to-unbalanced converters and/or switch circuits described above exhibit excellent function, like the multi-band high-frequency circuit shown in FIG. 3.

Figure 17:
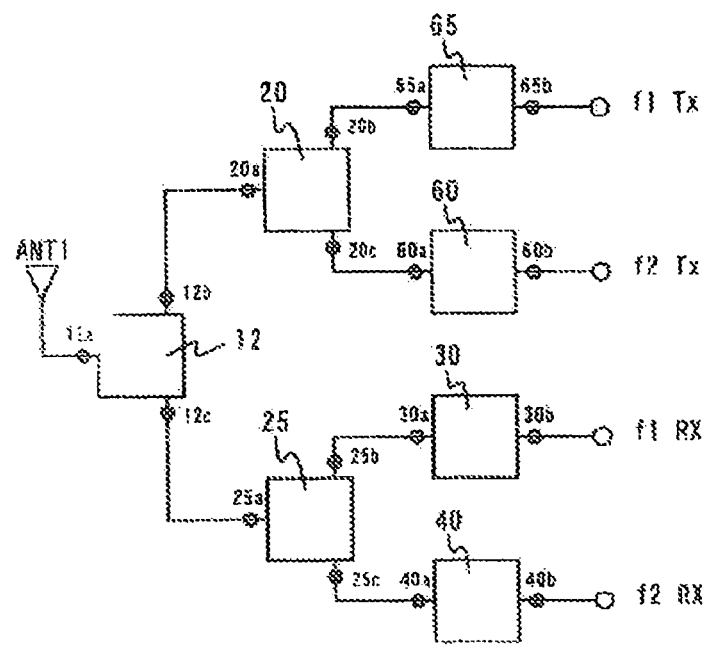
FIG. 17 is a block diagram showing a multi-band high-frequency circuit according to another embodiment of the present invention.
Figure 18:
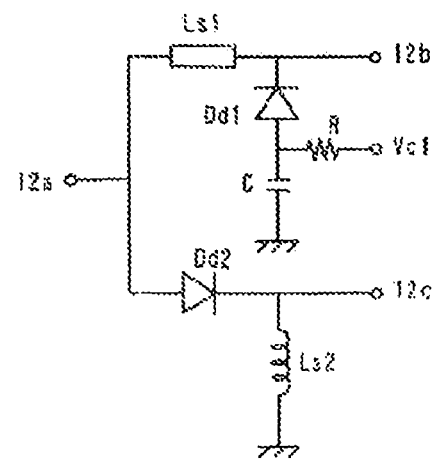
FIG. 18 is a view showing the equivalent circuit of one example of SPDT switches used in the present invention.
Figure 19:
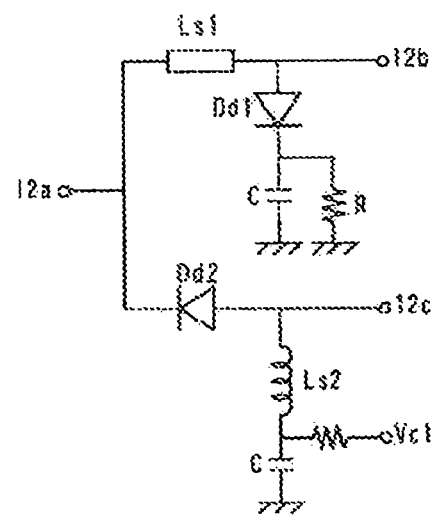
FIG. 19 is a view showing the equivalent circuit of another example of SPDT switches used in the present invention.
Figure 20:
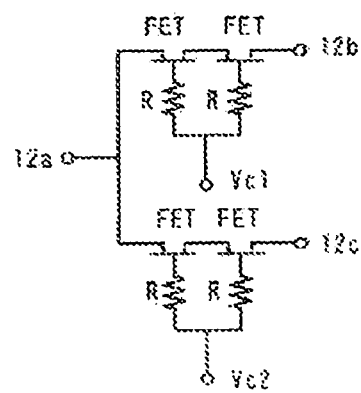
FIG. 20 is a view showing the equivalent circuit of a further example of SPDT switches used in the present invention.

When pluralities of multi-band antennas cannot be disposed, the use of an SPDT switch 12 as the high-frequency switch circuit 10 can provide a multi-band high-frequency circuit connected to one multi-band antenna as shown in the block diagram of FIG. 17. In this case, there is no difference from the embodiment shown in FIGS. 1-3 except for the switch circuit, so that the same function as in the multi-band high-frequency circuit in Embodiment 1 can be exhibited except for the diversity receiving. As the SPDT switch 12, the switch circuit shown in FIGS. 18-20 may be properly used.

Figure 21:
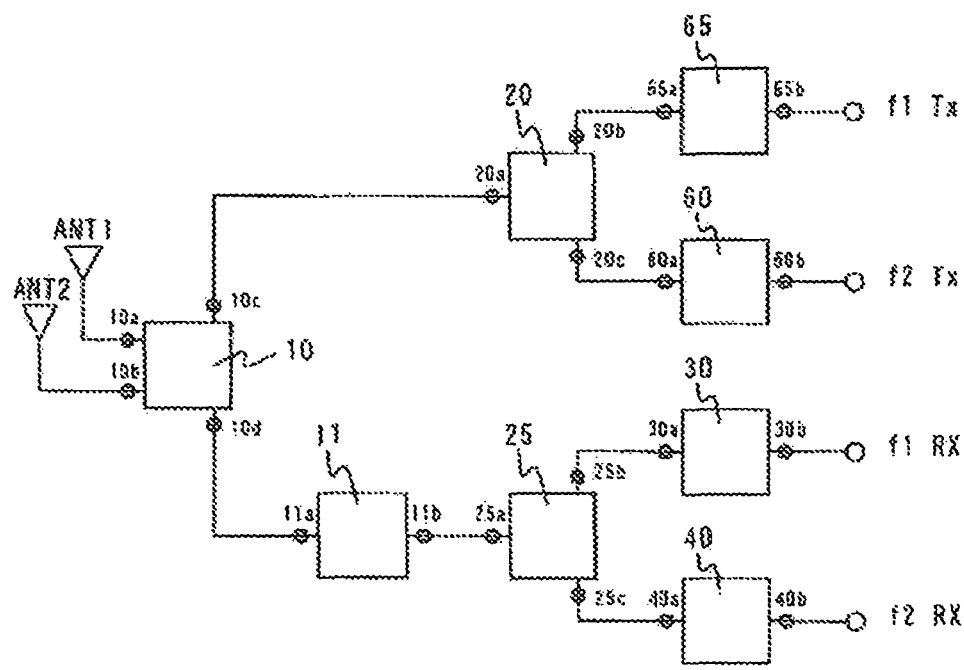
FIG. 21 is a block diagram showing a multi-band high-frequency circuit according to a further embodiment of the present invention.
Figure 22:
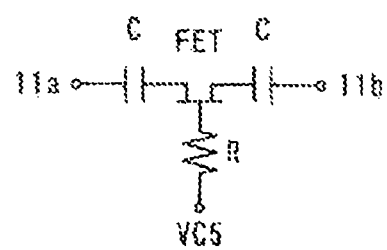
FIG. 22 is a view showing the equivalent circuit of one example of SPST switches used in the present invention.
Figure 23:
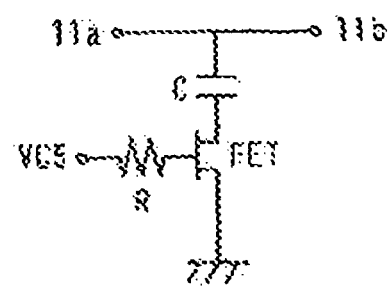
FIG. 23 is a view showing the equivalent circuit of another example of SPST switches used in the present invention.
Figure 24:
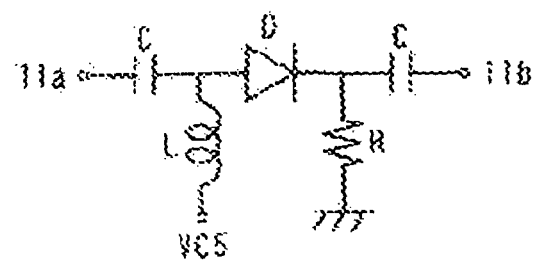
FIG. 24 is a view showing the equivalent circuit of a further example of SPST switches used in the present invention.
Figure 25:
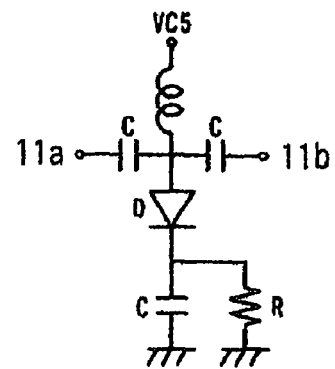
FIG. 25 is a view showing the equivalent circuit of a still further example of SPST switches used in the present invention.

To secure isolation between the transmitting circuits and the receiving circuits, as shown in FIG. 21, a single-pole, single-throw (SPST) switch circuit 11 is preferably disposed between the high-frequency switch circuit 10 and the second diplexer circuit 25. The SPST switch circuit 11 is constituted, for instance, by a switching element, an inductance element and a capacitance element as shown in FIGS. 22-25, to control that a signal is shut when the port 10c of the high-frequency switch circuit 10 is connected to the port 10a or 10b.

Embodiment 2

Figure 26:
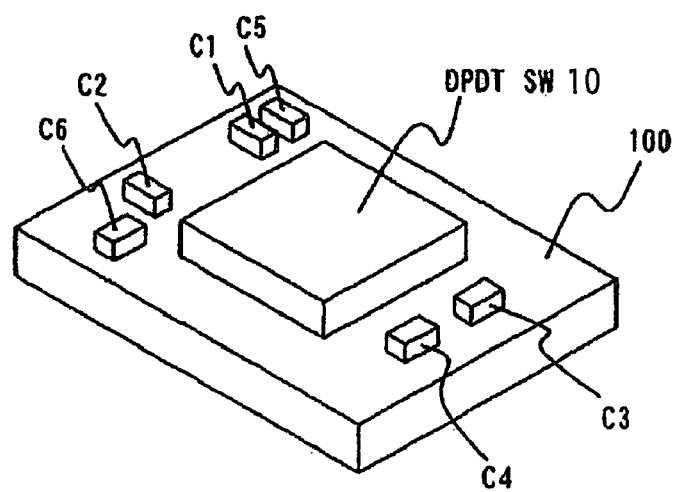
FIG. 26 is a perspective view showing a multi-band high-frequency circuit component according to one embodiment of the present invention.
Figure 27:
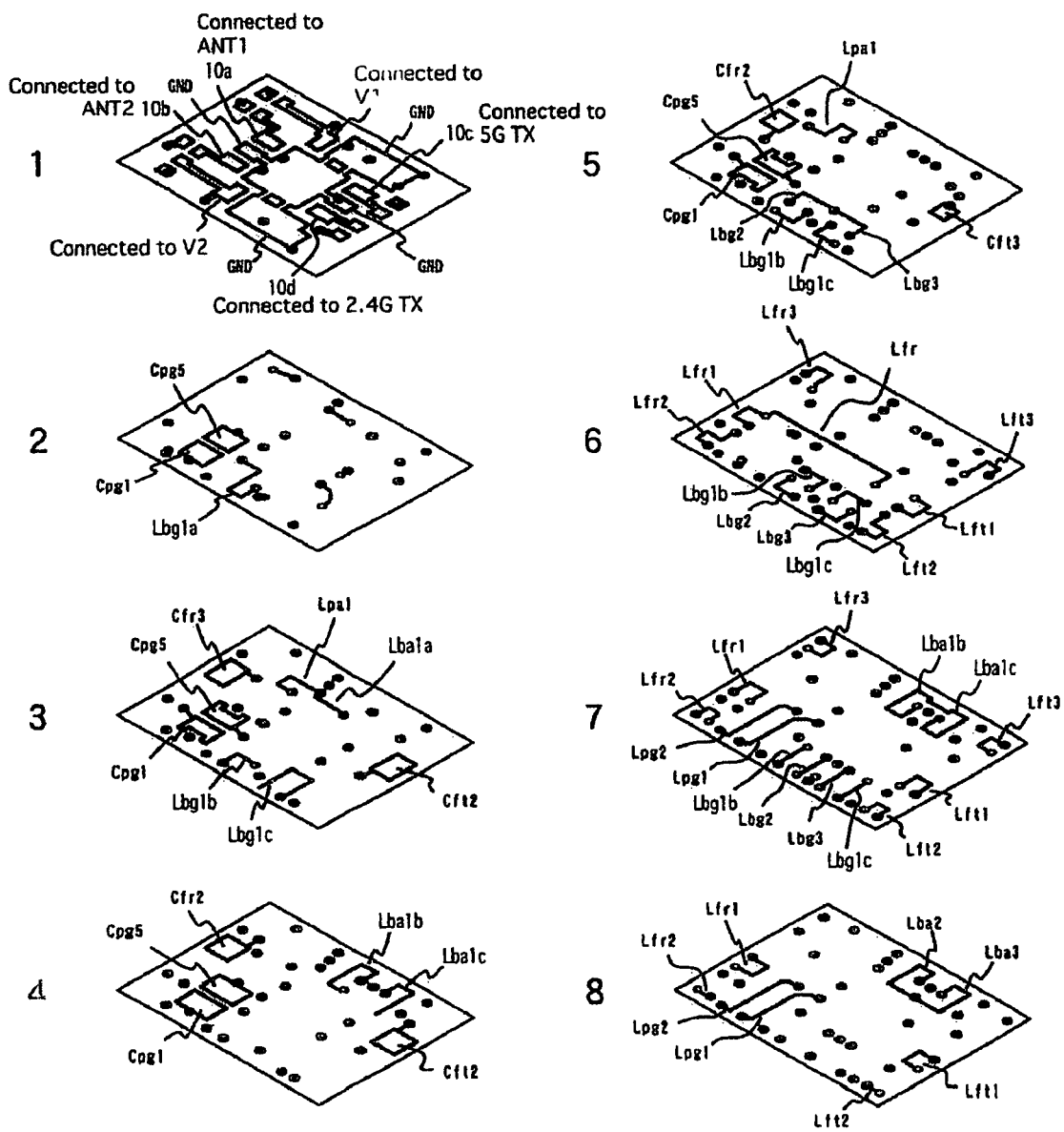
FIG. 27 is an exploded perspective view showing part of laminate substrates constituting the multi-band high-frequency circuit component of the present invention.
Figure 28:
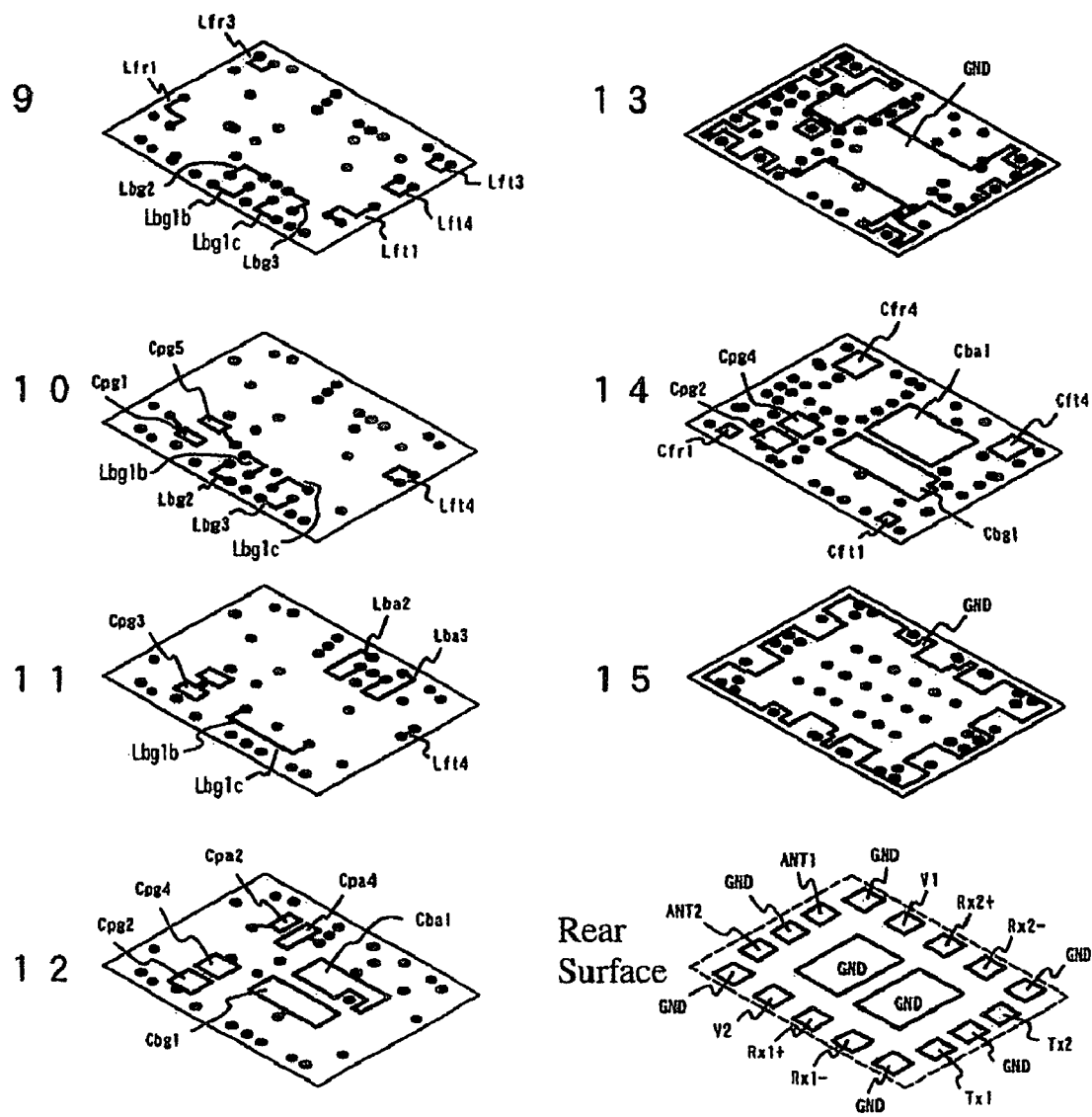
FIG. 28 is an exploded perspective view showing the remainders of laminate substrates constituting the multi-band high-frequency circuit component of the present invention.

An example of the multi-band high-frequency circuit having the equivalent circuit shown in FIG. 3 formed in a laminate is shown in FIGS. 26-28. FIG. 26 shows the appearance of a multi-band high-frequency circuit component comprising first and second diplexer circuits 20, 25, filter circuits 30, 40, 60, first and second balanced-unbalanced circuits 50, 55. etc. in and on a laminate. FIGS. 27 and 28 show the structure of each layer in the laminate 100 constituting the high-frequency circuit component.

The laminate 100 is produced by laminating pluralities of ceramic green sheets as thick as 10-200 μm and made of, for instance, a dielectric ceramic sinterable at as low a temperature as 1000° C. or lower, each of which is provided with an electrode pattern formed by printing a conductive paste of Ag, Cu, etc., and integrally sintering them.

A lowermost green sheet 15 is covered with a ground electrode GND on its front surface, and provided with terminal electrodes for mounting to a circuit substrate on its rear surface. The terminal electrodes comprise antenna ports ANT1, ANT2, transmission ports Tx1, Tx2 for inputting unbalanced signals, receiving ports Rx1+, Rx1−, Rx2+, Rx2− for outputting balanced signals, ground ports GND, and switch circuit-controlling ports V1, V2. and these ports are connected to electrode patterns on green sheets above through via-holes (shown by black circles in the figure) formed in the green sheets. In this embodiment, the terminal electrodes in a land grid array (LGA), but may be in a ball grid array (BGA), etc.

Green sheets 1-14 are laminated on the green sheet 15. On these green sheets, the first and second diplexer circuits 20, 25, the filter circuits 30, 40, 60, and the balanced-to-unbalanced converters 50, 55 are constituted by inductance elements formed by transmission lines, and capacitance elements formed by predetermined electrode patterns, which are properly connected through via-holes. Matching circuits 80, 85 disposed between the filter circuits 30, 40 and the balanced-to-unbalanced converters 50, 55 are formed by transmission lines having predetermined length. The inductance elements and the capacitance elements may of course be mounted onto the laminate 100 as chip inductors and chip capacitors.

Each circuit is three-dimensionally formed in the laminate 100, and electrode patterns constituting the circuits are disposed such that they are separated by the ground electrode GND or do not overlap in a lamination direction, to prevent unnecessary electromagnetic interference. Transmission lines through which a 5-GHz-band, high-frequency signal passes are separate from the other electrode patterns by at least 50 µm, to prevent electromagnetic interference.

Dielectric materials may be, for instance, ceramics comprising Al, Si and Sr as main components, and Ti, Bi, Cu, Mn, Na, K, etc. as sub-components; ceramics comprising Al, Si and Sr as main components, Ca, and Pb, Na, K, etc. as sub-components; ceramics comprising Al, Mg, Si and Gd; or ceramics comprising Al, Si, Zr and Mg. The dielectric materials have dielectric constants of about 5-15. Besides the dielectric ceramics, resins and resin/ceramic composite materials may be used. Further, electrode patterns may be formed by high-temperature-sinterable metal conductors such as tungsten, molybdenum, etc. on $Al_2O_3$-based dielectric substrates, by a high-temperature cofirable ceramic (HTCC) technology.

Pluralities of land electrodes are formed on a green sheet 1, and DPDT switches (GaAs FETs), and coupling capacitors that cannot be formed in the laminate are mounted as chip parts onto the land electrodes. The land electrodes are connected to connecting lines and circuit elements in the laminate through via-holes.

Bare switches are mounted onto the land electrodes, and the land electrodes may be sealed by resins or pipes. Such multi-band high-frequency circuit components are suitably miniaturized. Incidentally, RF-ICs or base-band ICs constituting the transmitting/receiving circuits may be integrated to the laminate.

Embodiment 3

Figure 29:
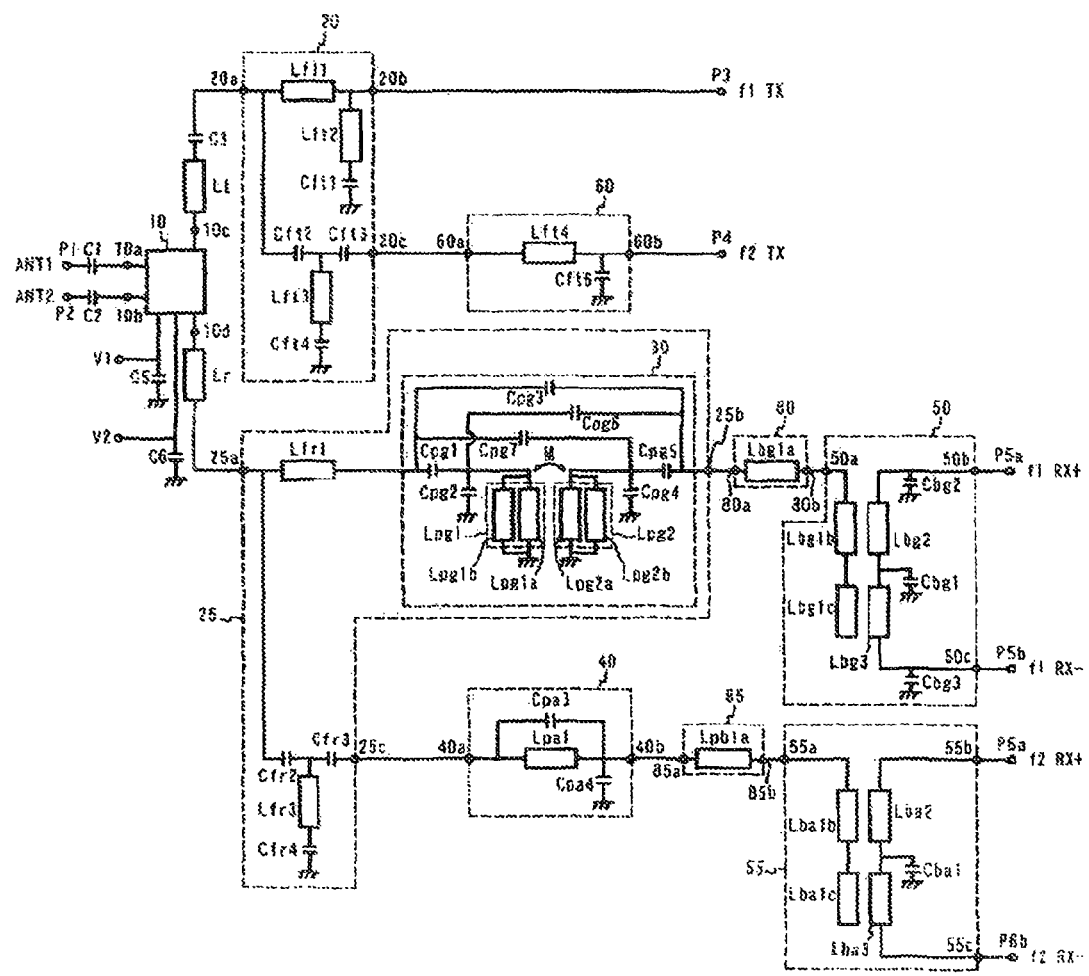
FIG. 29 is a view showing the equivalent circuit of a multi-band high-frequency circuit according to a still further embodiment of the present invention.

FIG. 29 shows the equivalent circuit of another multi-band high-frequency circuit. The feature of this multi-band high-frequency circuit is that the lower-frequency filter circuit in the second diplexer circuit 25 is constituted by a phase circuit Lfr1 and a bandpass filter circuit 30 having a 2.4-GHz passband. The phase circuit Lfr1 properly adjust the phase of a high-frequency signal, so that when viewed from the high-frequency switch circuit, the bandpass filter circuit 30 has high impedance in a band of 5 GHz, thereby preventing a 5-GHz-band, high-frequency signal from leaking to the receiving circuit in a 2.4-GHz band. In this embodiment, with the phase circuit Lfr1 constituted by transmission lines, the multi-band high-frequency circuit can be constituted by small numbers of circuit elements.

Embodiment 4

Figure 30:
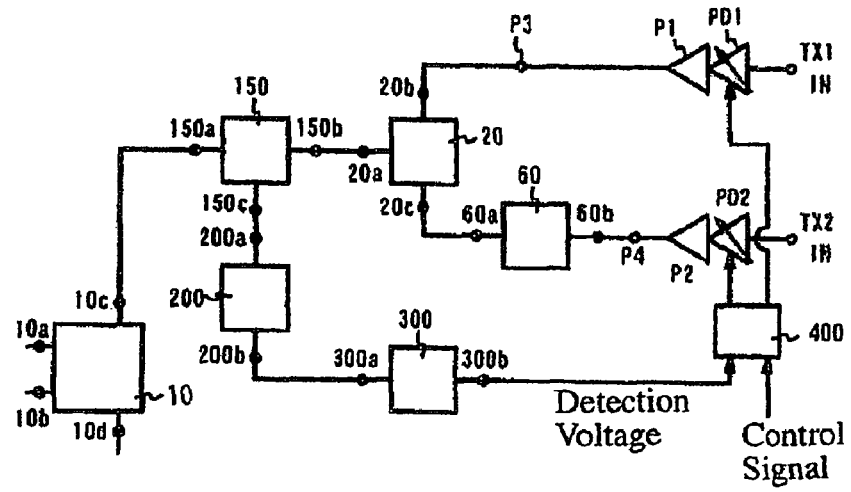
FIG. 30 is a block diagram showing a multi-band high-frequency circuit according to a still further embodiment of the present invention.
Figure 31:
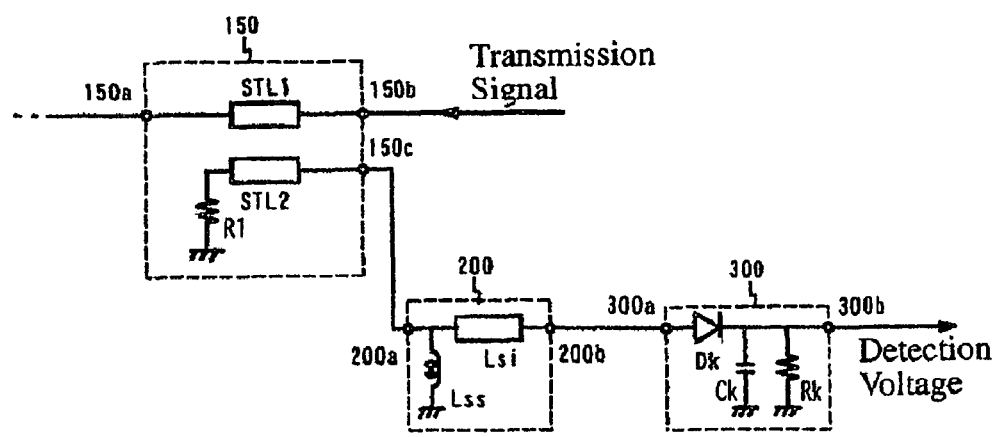
FIG. 31 is a view showing the equivalent circuit of a multi-band high-frequency circuit according to a still further embodiment of the present invention.
Figure 32:
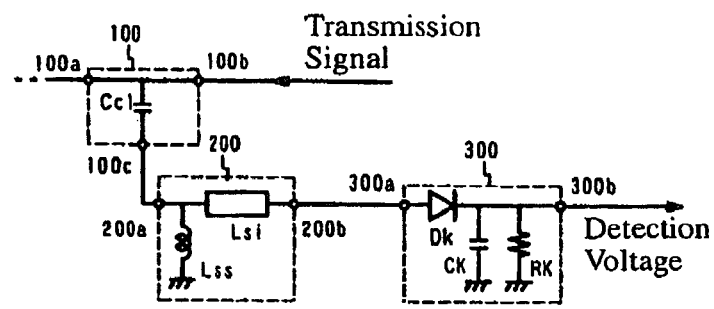
FIG. 32 is a view showing the equivalent circuit of a multi-band high-frequency circuit according to a still further embodiment of the present invention.
Figure 33:
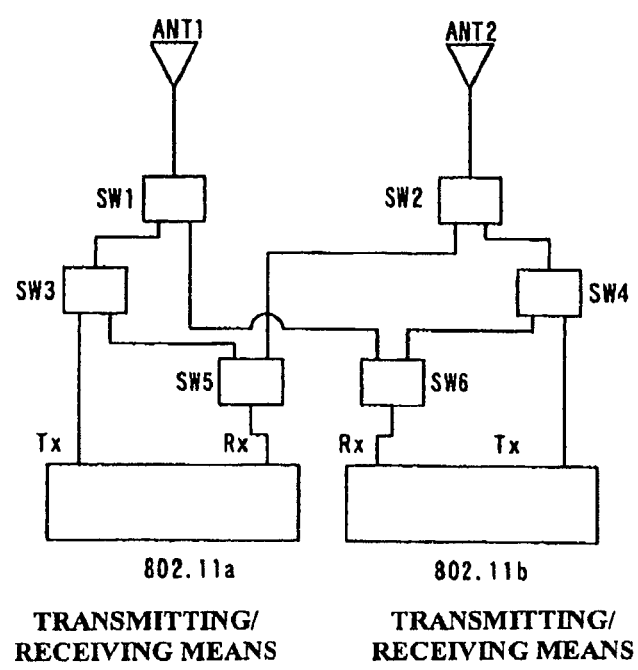
FIG. 33 is a block diagram showing a conventional multi-band communication apparatus.
Figure 34:
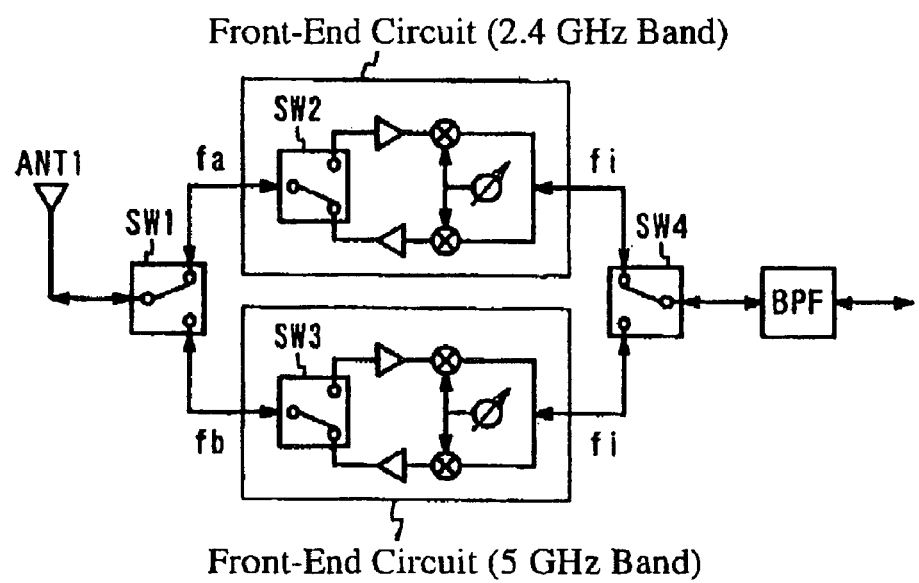
FIG. 34 is a block diagram showing another conventional multi-band communication apparatus.

A multi-band high-frequency circuit in a further embodiment is shown in FIGS. 30-32. FIG. 30 shows a transmitting circuit in a multi-band high-frequency circuit comprising a coupling circuit. In this embodiment, to provide a TPC function, a coupling circuit 150 adapted to pluralities of communication systems for getting part of transmission power is disposed between the high-frequency switch circuit 10 and the first diplexer circuit 20 in the multi-band high-frequency circuit in Embodiment 1.

In this embodiment, part of output power is detected from a 2.4-GHz-band, high-frequency signal and a 5-GHz-band, high-frequency signal by the coupling circuit 150 and a detection circuit 300 comprising a detection diode (Schottky diode). Thus, detection accuracy is increased by monitoring the output power near the antenna output terminal. The coupling circuit 150 may be constituted, for instance, by a directional coupler or a coupling capacitor.

In the multi-band high-frequency circuit in this Embodiment, one coupling circuit is used in a 2.4-GHz band and a 5-GHz band. The coupling circuit has a larger coupling degree in a 5-GHz band than in a 2.4-GHz band, with the difference as large as about 5 dB. The coupling degree difference directly affects detection voltage, resulting in different detection voltage to the output power from the amplifier. With a matching circuit 200 disposed between the coupling circuit 150 and the detection circuit 300, the impedance of the coupling circuit 150 and the impedance of the detection circuit 300 are matched in a 2.4-GHz band, so that large detection voltage can be obtained even in a 2.4-GHz band with a small coupling degree (detection voltage) difference.

The matching circuit is preferably constituted by a shunt inductor connected to the output port 150c of the coupling circuit 150, and a phase circuit connected between the coupling circuit 150 and the detection diode. In the matching adjustment of this matching circuit on a Smith chart, amplitude adjustment by the shunt inductor and phase matching by the phase circuit can be independently conducted. This simplifies the impedance matching of the coupling circuit and the detection circuit in a 2.4-GHz band.

FIG. 31 shows the equivalent circuit of a coupling circuit 150 in the multi-band high-frequency circuit comprising a directional coupler as the coupling circuit. The directional coupler is constituted by a main line STL1, a sub-line STL2 and a resistor R1, so that a transmission signal from the first diplexer circuit 20 is input to the input port 150b of the directional coupler 150 and output from the output port 150a. The main line STL1 and the sub-line STL2 are electromagnetically coupled, so that part of the transmission signal is output to the coupling port 150c.

The matching circuit 200 is constituted by a shunt inductor Lss and a phase circuit Lsi, and the constants of the shunt inductor Lss and the phase circuit Lsi are set such that the output impedance of the coupling port 150c of the directional coupling circuit is matched with the input impedance of the detection circuit 300 in a 2.4-GHz band. The shunt inductor Lss performs amplitude adjustment, and the phase circuit Lsi performs phase matching.

The detection diode Dk has an anode connected to the matching circuit 200, and a cathode connected to a voltage-smoothing circuit comprising shunt-connected capacitor Ck and resistor Rk. A high-frequency signal from the coupling circuit 150 is input to the detection diode Dk, and only a high-frequency signal exceeding its forward voltage is transmitted to the cathode, converted to DC voltage by the smoothing circuit, and input as detection voltage to a comparison control means connected to the output side of the detection circuit 300.

The comparison control means 400 is constituted by an operational amplifier, resistors, control transistors, etc., to compare an input reference signal and a detection signal supplied from the detection diode Dk to change the output power of the amplifier such that the level difference between the two signals becomes zero.

As another example of the high-frequency circuit, FIG. 32 shows a high-frequency circuit in which the coupling circuit portion shown in FIG. 31 is constituted by a coupling capacitor Cc1. In this coupling circuit, too, the coupling degree is higher by about 5 dB in a 2.4-GHz band than in a 5-GHz band, so that the detection voltage in a 2.4-GHz band can be increased by the matching circuit 200 to reduce the difference from that in a 5-GHz band.

In the circuit whose coupling circuit portion is constituted by the coupling capacitor Cc1, too, frequency change provides only little variations in the detection voltage, resulting in the reduced number of parts and miniaturization. Accordingly, such high-frequency circuit is suitable for communication systems of IEEE802.11h having a TPC function.

The multi-band high-frequency circuit of the present invention can select the most suitable channel without being influenced by noises, phasing, etc. in data communications by WLAN, and perform diversity receiving. The multi-band high-frequency circuit of the present invention can also switch the connection of multi-band antennas and transmitting circuits/receiving circuits while suppressing power consumption with few numbers of switch means.

APPLICABILITY IN INDUSTRY

With a high-frequency circuit component having the above high-frequency circuit in a small three-dimensional laminate structure, it is possible to provide a multi-band communication apparatus with a transmitting/receiving means for modulating transmission data and demodulating receiving data in each communication system, and a switch circuit controller for controlling the switching of the high-frequency switch.

The multi-band high-frequency circuit of the present invention having such features is suitable for personal computers, PC peripherals such as printers, hard disk drives, broadband rooters, etc.; electronic appliances such as facsimiles, refrigerators, standard-definition televisions, high-definition televisions, digital cameras, digital video recorders, cell phones, etc.; and signal-transmitting means in automobiles and aircrafts.

What is claimed is:

1. A high-frequency component comprising a laminate of substrates having electrode patterns and a multi-band high-frequency circuit for performing wireless communications among different communication systems having high-frequency bands and low-frequency bands, the multi-band high-frequency circuit comprising a high-frequency switch circuit comprising switching elements for switching the connection of at least one multi-band antenna to transmitting circuits and receiving circuits, a first diplexer circuit disposed between said high-frequency switch circuit and said transmitting circuits for branching a high-frequency signal into frequency bands of said communication systems, a second diplexer circuit disposed between said high-frequency switch circuit and said receiving circuits for branching a high-frequency signal into frequency bands of said communication systems, filter circuits disposed between said second diplexer circuit and said receiving circuits, respectively, and balanced-to-unbalanced converters disposed between said filter circuits and said receiving circuits, respectively, said first and second diplexers, filter circuits and balanced-to-unbalanced converters having inductance elements and capacitance elements, at least part of said inductance elements and capacitance elements being constituted by said electrode patterns, the electrode patterns of said first diplexer and the electrode patterns of said second diplexer not overlapping in a direction perpendicular to the laminate of substrates.

2. The high-frequency component according to claim 1, wherein said first and second diplexers are constituted by a combination of higher-frequency filter circuit and lower-frequency filter circuit, respectively, and wherein the electrode patterns of said higher-frequency filter circuit of each diplexer and the electrode patterns of said lower-frequency filter circuit of each diplexer do not overlap in a direction perpendicular to the laminate of substrates.

3. The high-frequency component according to claim 2, wherein the electrode patterns of said first and second diplexers, the electrode patterns of said filter circuits and the electrode patterns of said balanced-to-unbalanced converters do not overlap in a direction perpendicular to the laminate of substrates.

4. The high-frequency component according to claim 1, wherein a lowermost layer of said laminate of substrates is covered with a ground electrode on the front surface, and provided with terminal electrodes at the center and peripheral portions of the rear surface, said terminal electrodes being connected to said ground electrode through via-holes.

5. A high-frequency component comprising a laminate of substrates having electrode patterns and a multi-band high-frequency circuit for performing wireless communications among different communication systems having high-frequency bands and low-frequency bands, the multi-band high-frequency circuit comprising a high-frequency switch circuit comprising switching elements for switching the connection of at least one multi-band antenna to transmitting circuits and receiving circuits, a first diplexer circuit disposed between said high-frequency switch circuit and said transmitting circuits for branching a high-frequency signal into frequency bands of said communication systems, a second diplexer circuit disposed between said high-frequency switch circuit and said receiving circuits for branching a high-frequency signal into frequency bands of said communication systems, filter circuits disposed between said second diplexer circuit and said receiving circuits, respectively, and balanced-to-unbalanced converters disposed between said filter circuits and said receiving circuits, respectively, said first and second diplexers, filter circuits and balanced-to-unbalanced converters having inductance elements and capacitance elements, at least part of said inductance elements and capacitance elements being constituted by said electrode patterns, the electrode patterns constituting transmission lines through which high-frequency signal passes being separate from the other electrode patterns by at least 50 μm.

* * * * *